United States Patent [19]

Karnopp et al.

[11] Patent Number: 5,159,553
[45] Date of Patent: * Oct. 27, 1992

[54] STEERING CONTROL APPARATUS

[75] Inventors: Dean C. Karnopp; Yoshiyuki Yasui, both of Davis, Calif.

[73] Assignee: Aisin Seiki Kabushiki Kaisha, Kariya, Japan

[*] Notice: The portion of the term of this patent subsequent to Jul. 10, 2007 has been disclaimed.

[21] Appl. No.: 475,899

[22] Filed: Feb. 6, 1990

Related U.S. Application Data

[63] Continuation-in-part of Ser. No. 243,822, Sep. 13, 1988, Pat. No. 4,941,097.

[51] Int. Cl.$^5$ .............................. B62D 5/22
[52] U.S. Cl. .................. 364/424.05; 180/79.1; 180/142; 180/148
[58] Field of Search ............ 364/424.05; 180/79.1, 180/132, 141, 142, 148, 79.3

[56] References Cited

U.S. PATENT DOCUMENTS

| | | | |
|---|---|---|---|
| 3,866,706 | 2/1975 | Lincke et al. | 180/142 |
| 4,049,961 | 9/1977 | Marcy | 250/202 |
| 4,189,955 | 2/1980 | Bishop | 74/498 |
| 4,540,059 | 9/1985 | Shibahata et al. | 180/142 |
| 4,549,468 | 10/1985 | Trintignac et al. | 91/361 |
| 4,706,771 | 11/1987 | Kawabet et al. | 180/142 |
| 4,708,220 | 11/1987 | Noto et al. | 180/142 |
| 4,718,685 | 1/1988 | Kawabe et al. | 280/91 |
| 4,735,271 | 4/1988 | Shimizu | 180/79.1 |
| 4,758,053 | 7/1988 | Yasuno | 303/91 |
| 4,759,419 | 7/1988 | Nagae et al. | 180/142 |
| 4,771,846 | 9/1988 | Venable et al. | 180/142 |
| 4,773,012 | 9/1988 | Ito et al. | 364/424.01 |
| 4,800,974 | 1/1989 | Wand et al. | 180/79.1 |
| 4,830,127 | 5/1989 | Ito et al. | 180/79.1 |
| 4,878,557 | 11/1989 | Shibahata et al. | 180/140 |
| 4,921,061 | 5/1990 | Asano | 180/79.1 |
| 4,941,097 | 7/1990 | Karnopp et al. | 364/424.05 |

FOREIGN PATENT DOCUMENTS

| | | |
|---|---|---|
| 0150856 | 8/1985 | European Pat. Off. |
| 0282041 | 9/1988 | European Pat. Off. |
| 0351146 | 1/1990 | European Pat. Off. |
| 0379430 | 7/1990 | European Pat. Off. |
| 2227986 | 11/1974 | France |
| 2636288 | 3/1990 | France |
| 1411829 | 10/1975 | United Kingdom |
| 2203395 | 10/1987 | United Kingdom |

OTHER PUBLICATIONS

Article: "Adaptive Steering", J. T. Kasselmann et al (pp. 26-35).

Primary Examiner—Thomas C. Black
Assistant Examiner—Collin W. Park
Attorney, Agent, or Firm—Burns, Doane, Swecker & Mathis

[57] ABSTRACT

The steering stability of a moving vehicle is maintained by measuring an actual yaw rate of the vehicle and determining a desired yaw rate of the vehicle and producing an output signal in response to a comparison of the actual and desired yaw rates. The steering angle of steerable wheels of the vehicle is controlled in response to the output signal in a manner tending to substantially conform the actual yaw rate to the desired yaw rate, thereby maintaining vehicle stability. The steerable wheels are steered by a steering wheel, and are independently steered by a motor in response to the output signal. That motor may comprise a fluid motor or an electric motor.

13 Claims, 9 Drawing Sheets

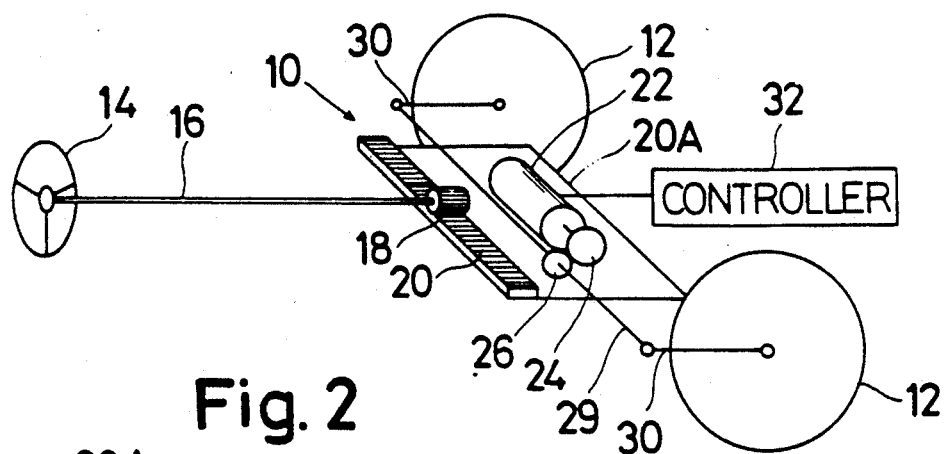
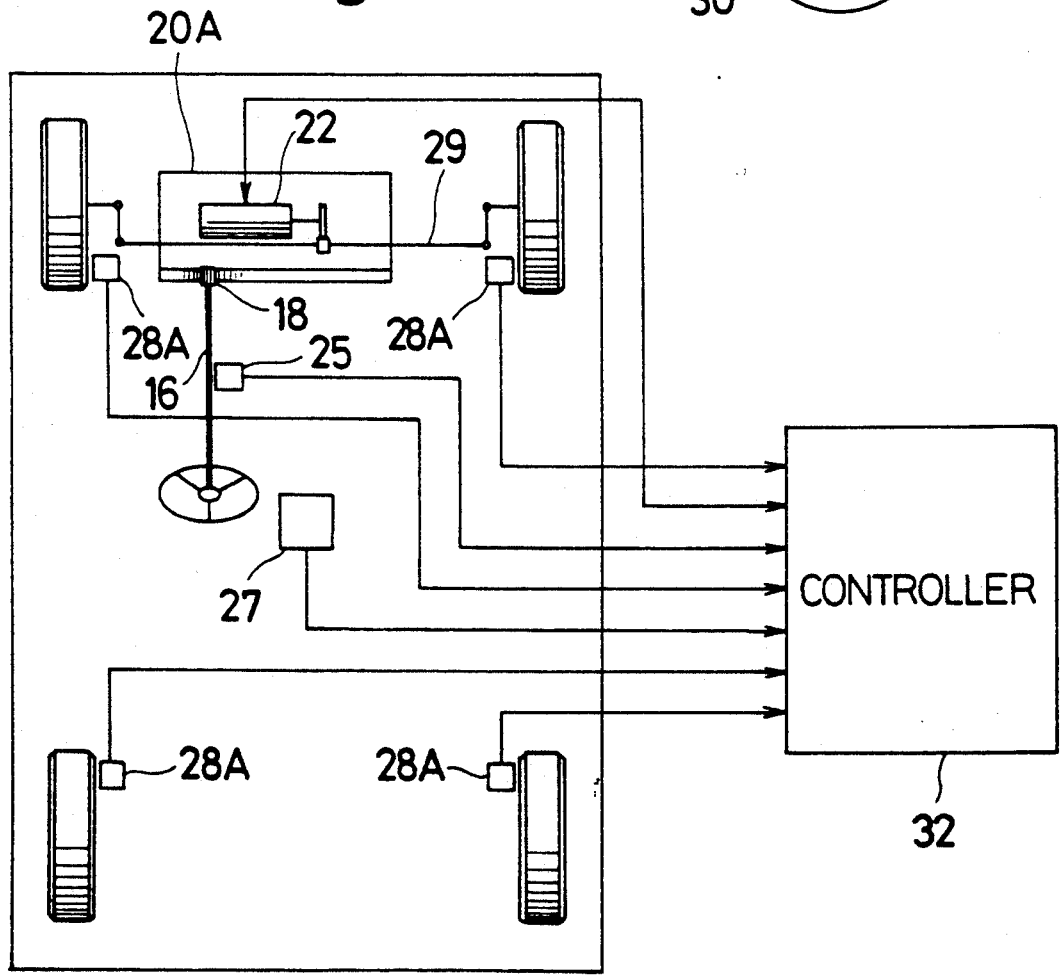

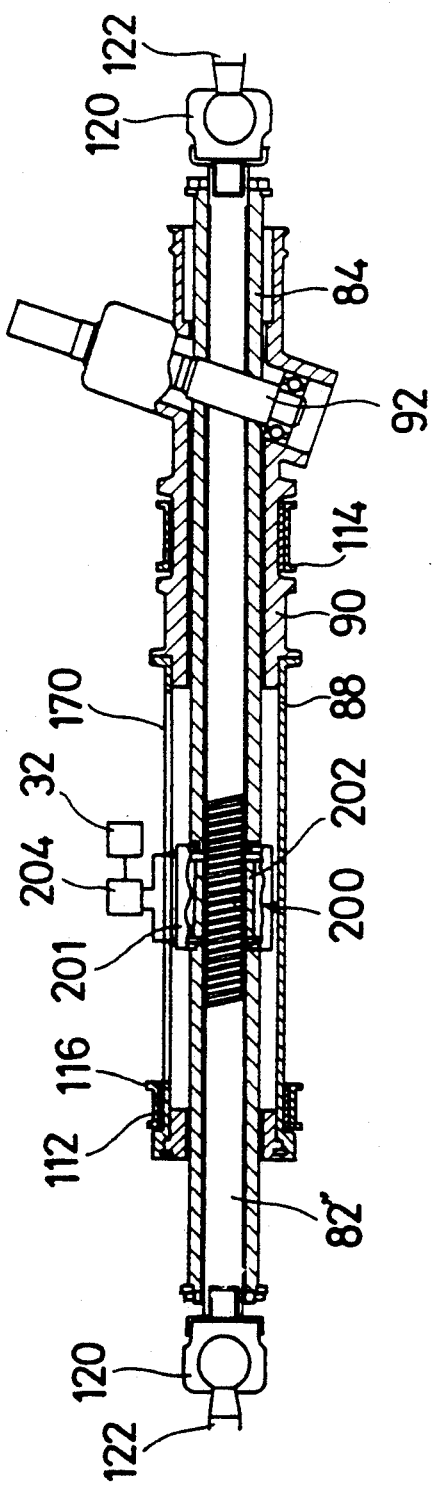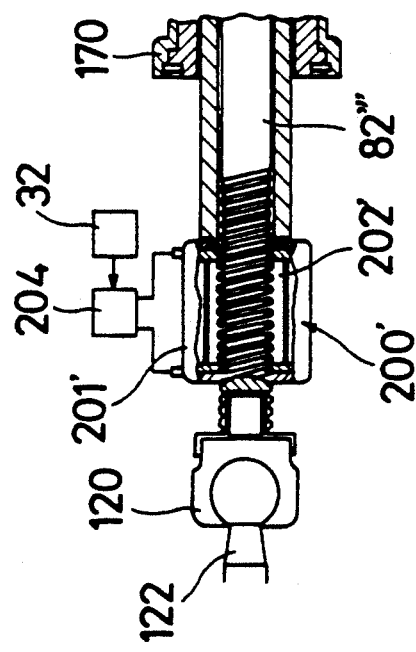

STEERING CONTROL APPARATUS

RELATED INVENTIONS

This is a Continuation-In-Part of U.S. application Ser. No. 07/243,822 now U.S. Pat. No. 4,941,097, filed Sep. 13, 1988.

BACKGROUND OF THE INVENTION

The present invention generally relates to apparatus for steering a vehicle.

During vehicle motion, such as cornering, for example, vehicle handling dynamics are affected by various parameters such as road conditions, tire characteristics, weight distribution, braking, accelerating, and the like, which can lead to oversteer or understeer conditions. In an effort to deal with this problem and attempt to maintain vehicle handling dynamics constant, there have been heretofore proposed complex suspension link systems, drive train arrangements, and braking systems. However, such proposed systems involve relatively numerous parts which undesirably increase the complexity and size of the system.

BRIEF SUMMARY OF THE INVENTION

The present invention involves an apparatus for maintaining steering stability of a moving vehicle. The apparatus comprises steerable wheels, steering arms connected to the steerable wheels, and a steering mechanism for steering the steerable wheels. The steering mechanism includes a movable rack and a main steering mechanism, including a steering wheel and pinion, connected to the movable rack for moving the movable rack. A motor operably interconnects the movable rack and the steering arms for transmitting steering forces from the main steering mechanism to the steerable wheels. The motor comprises relatively movable first and second parts. The first part is connected to the movable rack and the second part is connected to the steering arm. A measuring device is provided for measuring an actual value for a condition of the vehicle, such as yaw rate for example. A control mechanism is provided for determining a desired value for that condition, for the vehicle, and for generating an output signal in response to a comparison of the desired and actual values. The control mechanism is operably connected to the motor whereby the motor is actuated in response to the output signal to steer the steerable wheel independently of the movement of the movable rack.

The motor may comprise a fluid motor wherein the first part comprises a fluid cylinder and the second part comprises a piston.

Alternatively, the motor may comprise an electric motor wherein the first part of the motor comprises a housing connected to the rack, and the second part of the motor comprises a threaded nut mounted on a threaded periphery of a tie rod.

Preferably, a rack comprises a hollow cylindrical member mounted within a hollow housing. The housing is connected to the vehicle frame by means of elastic grommets. The rack is eccentrically arranged with respect to the tie rod to define an enlarged radial thickness portion of the rack in which the racks are formed.

BRIEF DESCRIPTION OF THE DRAWINGS

The objects and advantages of the invention will become apparent from the following detailed description of preferred embodiments thereof in connection with the accompanying drawings in which like numerals designate like elements, and in which:

FIG. 1 is a schematic perspective view of a first embodiment of a steering mechanism for the steerable wheels of a vehicle, in accordance with the present invention;

FIG. 2 is a schematic diagram of a first embodiment of a mechanism for controlling the steering mechanism, according to the present invention;

FIG. 10 is a longitudinal sectional view through a mechanism operating in accordance with the embodiment disclosed in connection with FIG. 1;

FIG. 10A is a fragmentary longitudinal view through a modified form of the steering mechanisms depicted in FIGS. 8 and 10, respectively;

DETAILED DESCRIPTION OF PREFERRED EMBODIMENTS OF THE INVENTION

Figure 3:
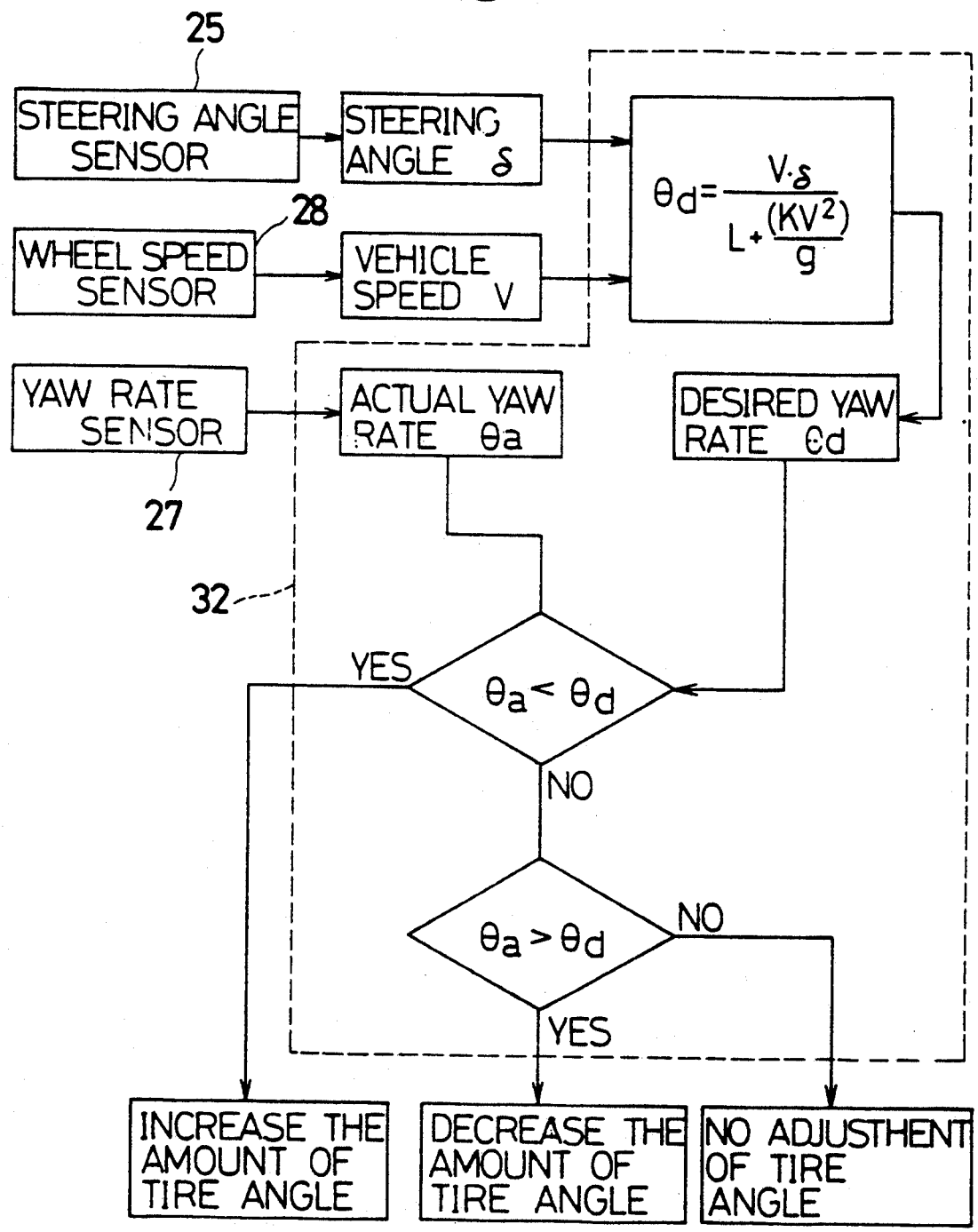
FIG. 3 is a flow chart for the system shown in FIG. 2.

Depicted in FIG. 1 is a steering system 10 for a vehicle which includes a pair of steerable wheels 12 operably connected to a steering wheel 14 by means of a steering mechanism. The steering mechanism is of the rack and pinion type wherein the steering shaft 16 carries a pinion 18 which meshes with teeth on a reciprocable rack 20. Fixed on an extension 20A of the rack is an electric motor housing 22. The motor includes an output shaft which drives an output gear 24. The output gear meshes with a helical thread of a nut 26 which is fixed to a tie rod 29. The ends of the tie rod 29 are connected to a pair of steering arms 30 which transmit steering motion to the steerable wheels 12.

Thus, in practice, the shaft 16 and pinion produce linear movement of the rack 20 and rack extension 20A, and such linear movement is transmitted to the motor housing and output gear 24. The latter produces a linear movement of the nut 26 due to the meshed coupling between the output gear 24 and the nut 26. Linear movement of the nut 26 is transmitted directly to the tie rod 29. In this fashion, the orientation of the wheels 12 can be varied by turning the steering wheel.

In order to prevent excessive oversteer or understeer, the present invention enables the wheel orientation to be adjusted independently of the position of the steering wheel by actuation of the motor 22 to produce rotation of the output gear 24 and a resulting linear movement of the nut 26 and tie rod 29.

Actuation of the motor 22 is produced by electrical signals from a controller 32 in response to a certain condition of the moving vehicle, such as the yaw rate of the vehicle, for example. If yaw rate is the condition being used, the controller 32 utilizes signals dependent upon steering angle and vehicle speed to determine a desired yaw rate, and compares that desired yaw rate to an actual yaw rate to control the tire angle. Yaw rate can be defined as the rate of rotation of the vehicle about a vertical axis.

The steering angle signal $\delta$ is provided by a conventional steering wheel angle sensor 25 which is operably connected to the steering shaft 16 of the vehicle. The vehicle speed signal V is provided by conventional wheel speed sensors 28A operably connected to all ground wheels of the vehicle. If the wheel speeds are different, the controller will obtain an average thereof. An actual yaw rate is measured by a conventional yaw rate sensor such as a gyro 27.

A desired yaw rate ($\theta_d$) is calculated by the controller in accordance with the relationship:

$$\theta_d = \frac{V \cdot \delta}{L + \left(\frac{KV^2}{g}\right)}$$

where $\theta_d$ is the desired yaw rate, L is the length of the wheel base of the vehicle (i.e., the distance between the front and rear axles), g is acceleration due to gravity, $\delta$ is the steering angle, V is vehicle speed, and K is a constant greater than 0 and no greater than 1 degree in order to achieve a neutral or slightly understeer condition.

After determining the desired yaw rate $\theta_d$ in the above manner, the controller compares the desired yaw rate value with the actual yaw rate $\theta_a$. When $\theta_a = \theta_d$ no steering adjustment is necessary; when $\theta_1 < \theta_d$, an understeer condition exists, requiring that the amount of tire angle be increased; and when $\theta_a > \theta_d$, an oversteer condition exists requiring that the amount of tire angle be decreased. The direction in which the output gear 24 is rotated is dependent upon which of the values $\theta_a$ and $\theta_d$ is larger, and the amount of rotation of the output gear 24 is dependent upon the magnitude of the difference between the values $\theta_a$ and $\theta_d$. Rotation of the output gear 24 continues until the controller observes that $\theta_a = \theta_d$.

Figure 4:
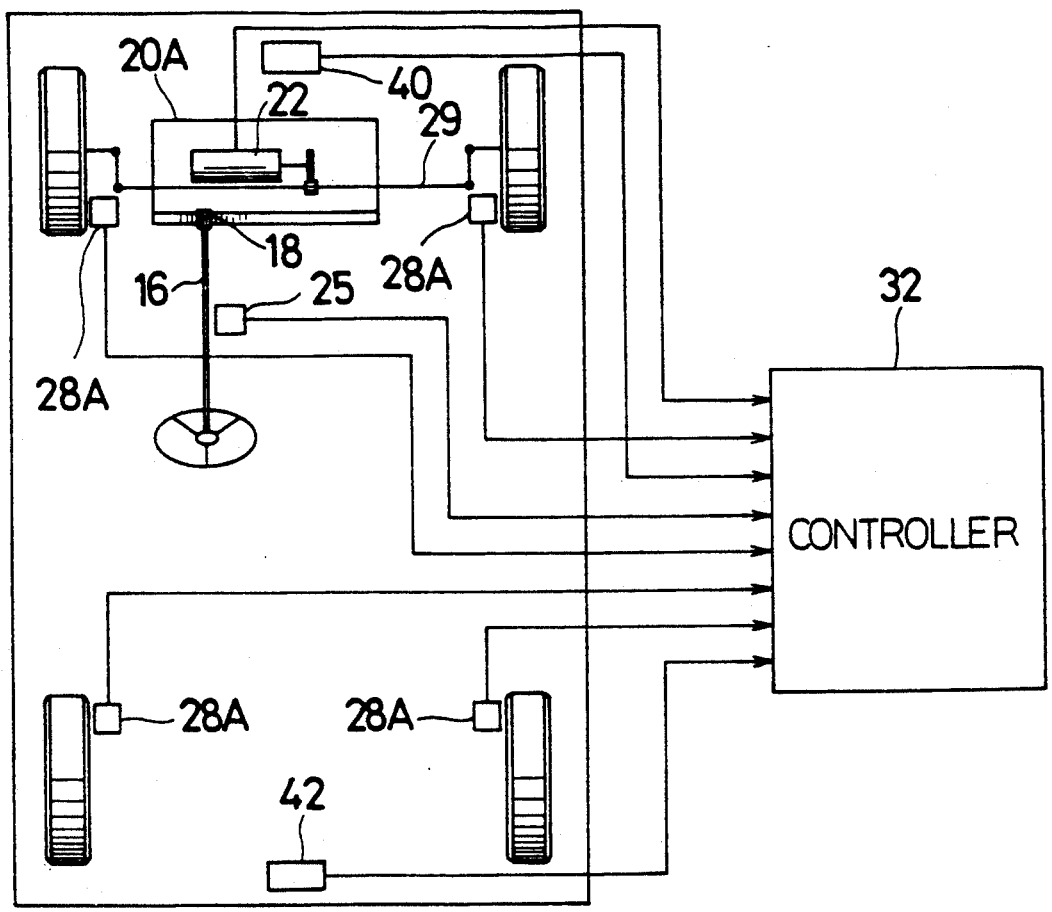
FIG. 4 is a schematic diagram of a second embodiment of a system for controlling the steering mechanism, in accordance with the present invention.
Figure 5:
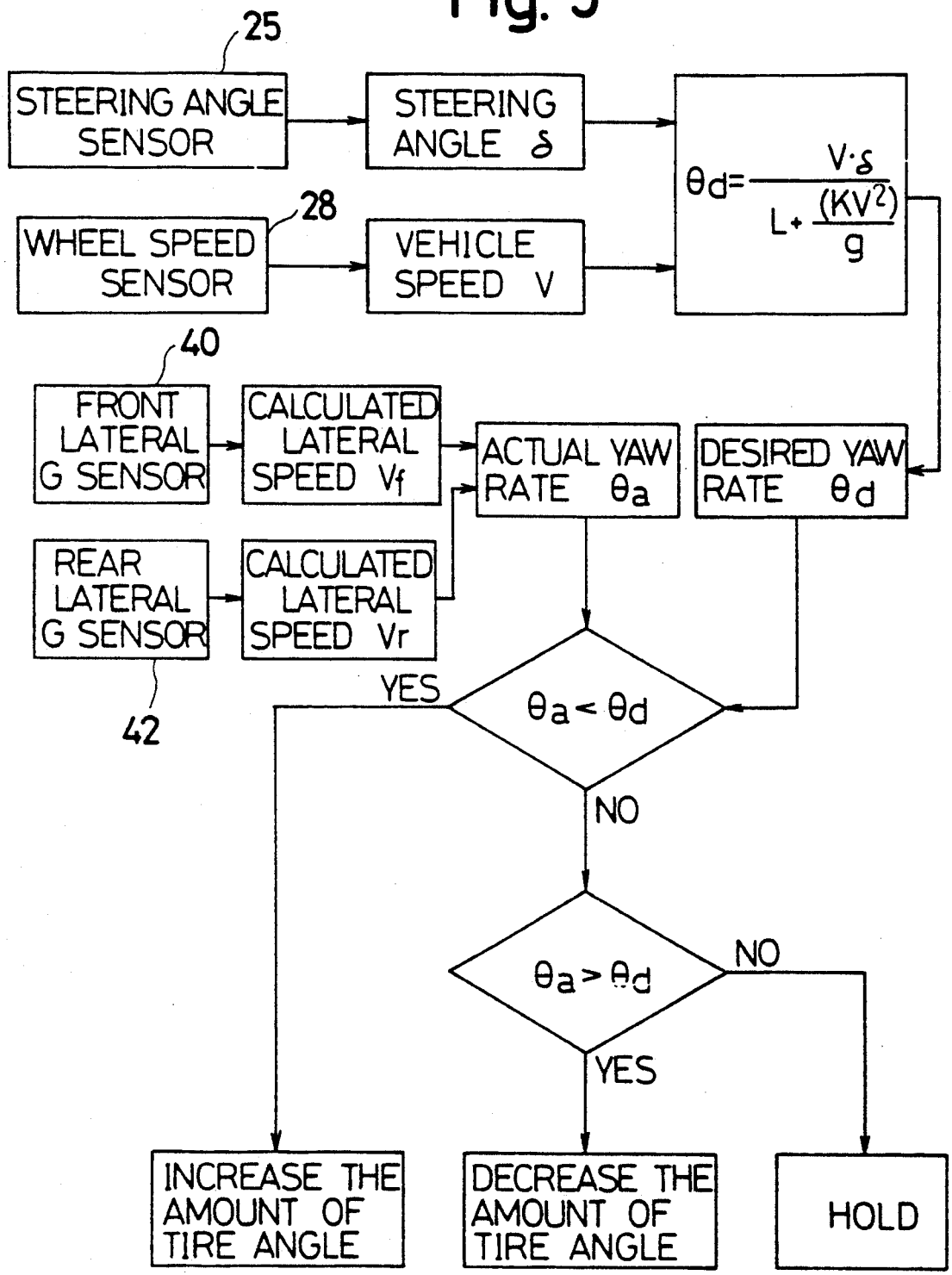
FIG. 5 is a flow chart for the system shown in FIG. 4.

In FIGS. 4 and 5, another preferred embodiment of the control aspect of the present invention is depicted wherein an alternative way of determining actual yaw rate is employed. That is, in lieu of a yaw rate sensor there are employed conventional front and rear lateral acceleration (G-force) sensors 40, 42. The measured front and rear lateral accelerations are converted to front and rear lateral velocity values $V_f$, $V_r$, respectively, by the controller, enabling the actual yaw rate $\theta_a$ to be determined by the following relationship:

$$\theta_a = \frac{V_f - V_r}{N}$$

where N is the distance between the front and rear sensors 40, 42.

Figure 6:
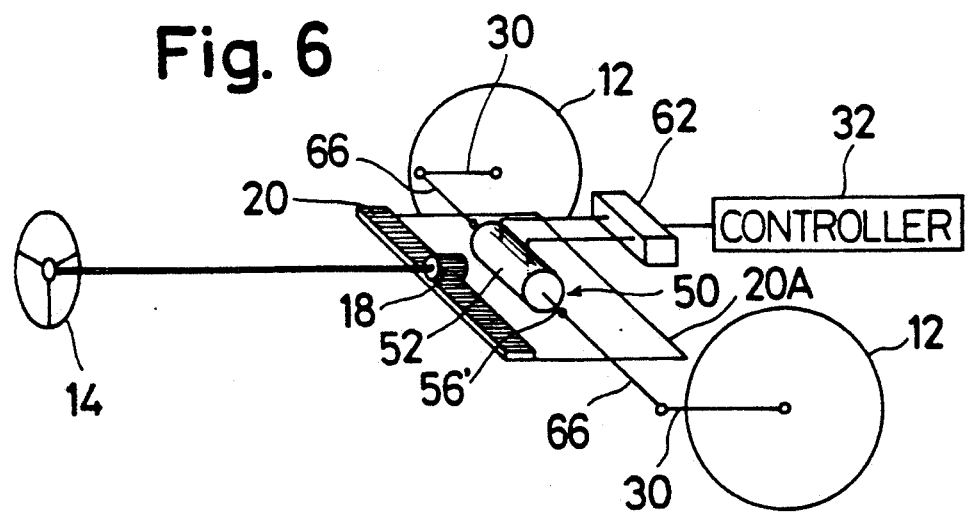
FIG. 6 is a schematic perspective view of a second embodiment of a steering mechanism for steering the steerable wheels.
Figure 7:
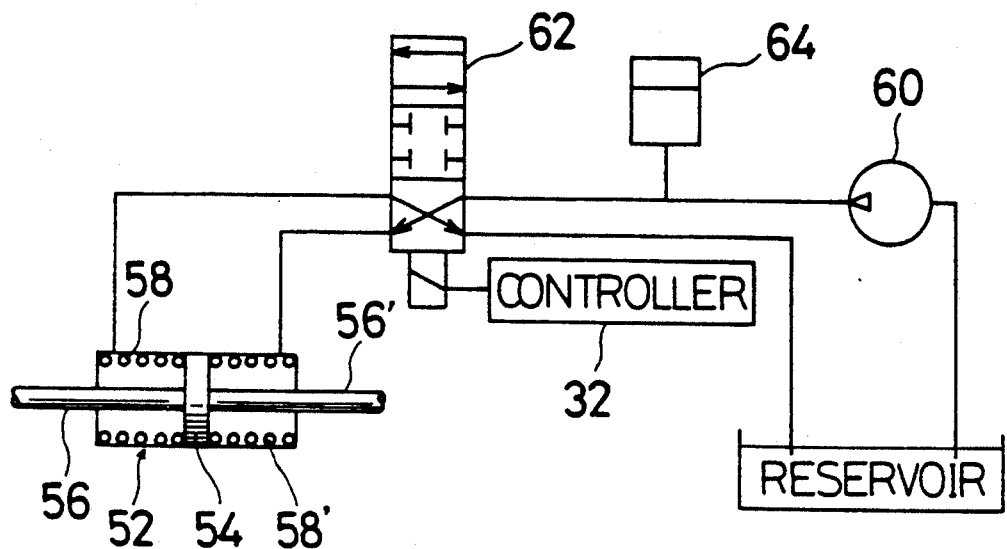
FIG. 7 is a schematic representation of a portion of the steering mechanism of FIG. 6.

In FIGS. 6 and 7, a second preferred embodiment of a steering mechanism aspect of the invention is depicted wherein the electric motor has been replaced by a fluid motor 50. The fluid motor comprises a fluid cylinder 52 in which is disposed a reciprocable piston 54. A pair of piston rods 56, 56' are connected to opposite sides of the piston 54 and project from opposite ends of the cylinder. A pair of springs 58, 58' disposed within the cylinder bias the piston 54 to a central location within the cylinder 52. An oil pump 60, operated by the engine, supplies pressurized fluid to a three-way solenoid valve 62, the position of which is determined by a signal from the controller 32. An accumulator 64 can be provided in the fluid line between the pump 60 and the valve 62 to dampen vibrations in oil pressure.

In operation, steering of the wheels 12 is effected by the steering wheel 14 and the rack and pinion coupling 18, 20. Linear movement of the rack 20 is transmitted to the cylinder 52 which is fixedly mounted on the rack extension 20A. Linear movement of the cylinder is transmitted to the tie rods 66 which are connected to outer ends of the piston rods 56, 56'. In the event that the controller 32 detects an understeer or oversteer condition, the electrically actuable solenoid valve 62 is actuated by an electric output signal from the controller 32 to displace the piston in either of two directions to turn the wheels 12 independently of the position of the steering wheel, thereby making the needed correction in tire angle.

Figure 8:
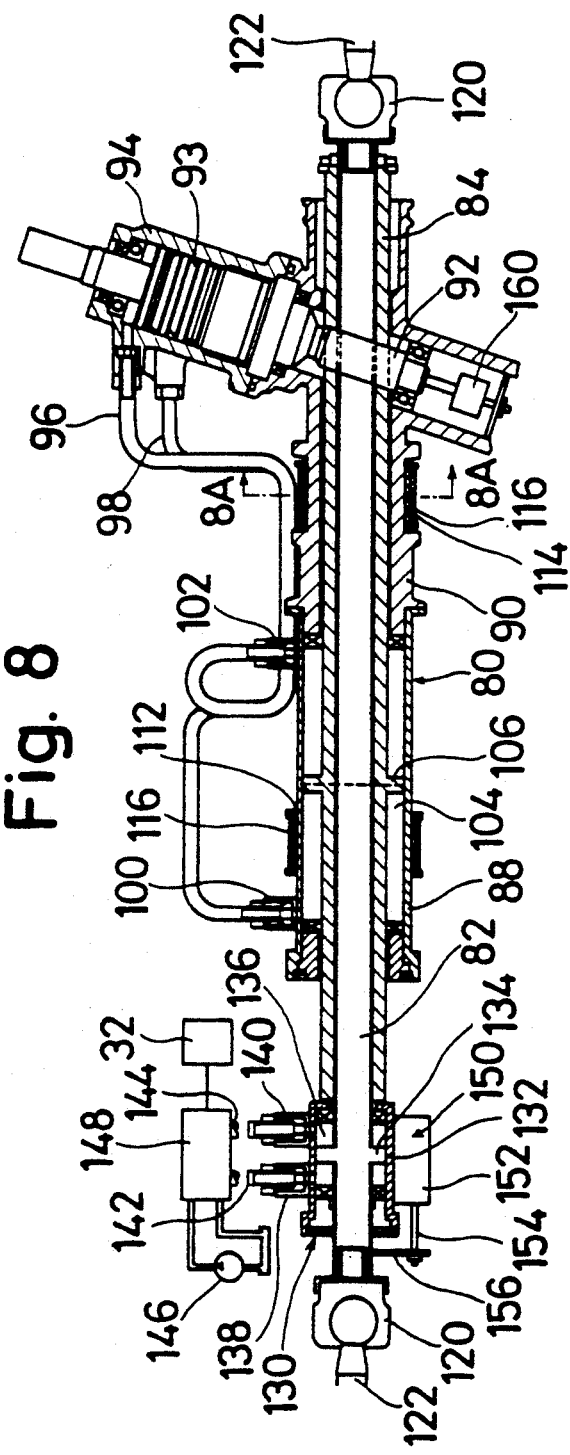
FIG. 8 is a longitudinal sectional view through a mechanism operating in accordance with the embodiment disclosed in connection with FIG. 6.
Figure 8B:
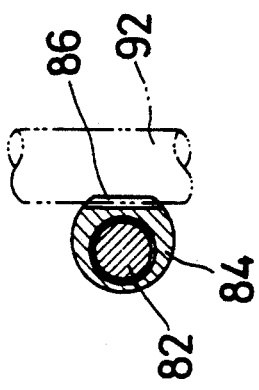
FIG. 8B is a cross-sectional view depicting the manner in which a steering pinion engages a rack.
Figure 8A:
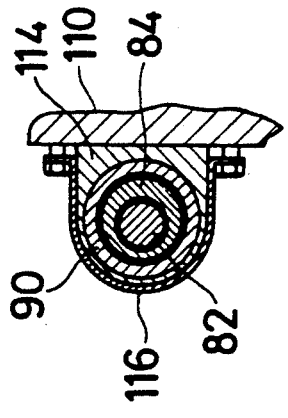
FIG. 8A is a cross-sectional view taken along the line 8A—8A in FIG. 8.
Figure 9:
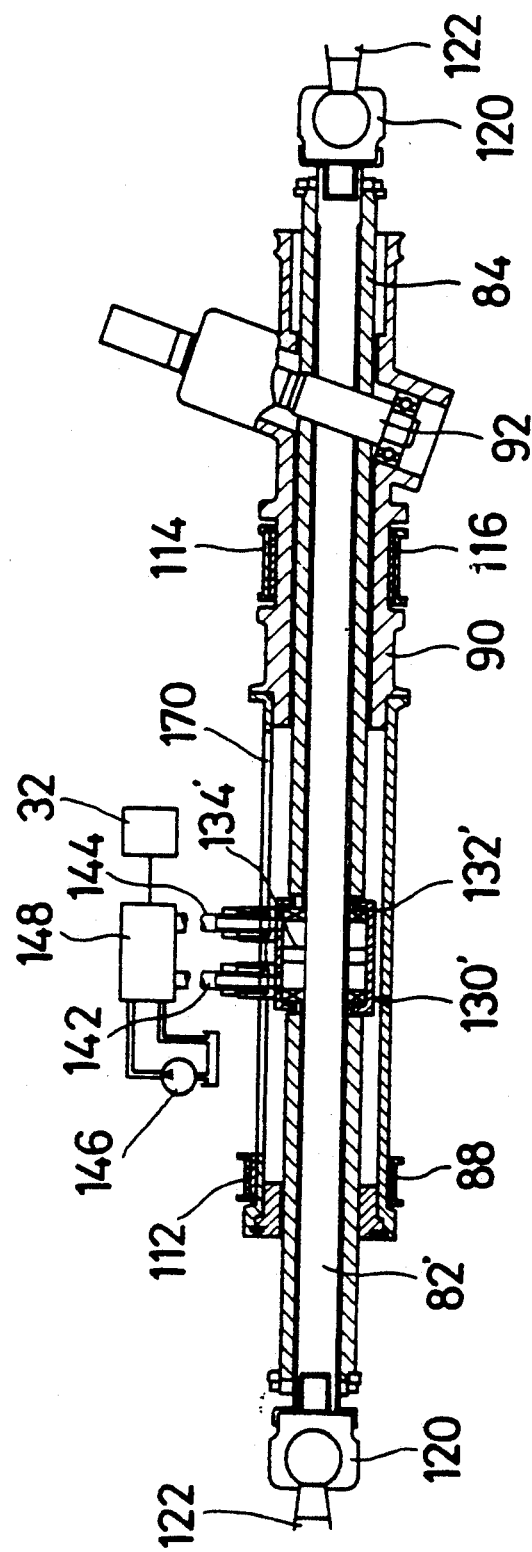
FIG. 9 is a longitudinal sectional view through another mechanism operating in accordance with the embodiment disclosed in connection with FIG. 6.

Depicted in FIGS. 8-10 are a number of preferred mechanisms which operate in accordance with the system disclosed in connection with FIGS. 6 and 7. FIGS. 8, 8A and 8B depict one of those mechanisms 80 in which a steering rod 82 is axially slidably mounted in a rack 84 in the form of a hollow cylinder. The rack includes teeth 86 formed on a portion of its outer circumference (see FIG. 8B). The rack 84 is eccentrically arranged relative to the tie rod 82, with the teeth 86 formed in the resulting thicker portion of the rack 84 to create a proper balance. The rack 84 is axially slidably mounted in a housing formed by axially aligned portions 88, 90, the former constituting a power steering housing and the latter constituting a steering gear housing.

Mounted in the steering gear housing 90 is a conventional pinion 92 which is mechanically coupled to the steering shaft. The pinion 92 meshes with the teeth of the rack (see FIG. 8B). The steering gear housing 90 includes a power steering valve housing 94 from which a pair of fluid lines 96, 98 extend. Those lines are connected to fittings 100, 102 carried by the power steering housing 88 to communicate with a power steering chamber 104 on opposite sides of a power steering piston 106 disposed in that chamber 104. Connected to the pinion 92 is a conventional power steering control valve 93 which controls the flow of power steering fluid from a pump (not shown) to a respective one of the lines 96, 98, depending upon the direction in which the steering wheel is turned.

The housing assembly 80 is mounted to a rigid frame 110 of the vehicle by means of a pair of elastic grommets 112, 114. Each grommet is in the form of a hollow cylinder through which a respective part of the housing extends. The grommet 112 receives the power steering housing 88, and the other grommet 114 receives the steering gear housing 90. Each grommet is bolted to the frame 110 by means of a bracket 116. Vibrations of the housing are dampened by the grommets.

Secured to opposite ends of the steering rod 82 are ball joints 120 which are attached to the steerable wheels by steering arms 122. Axial displacement of the tie rod 82 in either direction produces a steering of the steerable wheels. The axial displacement of the tie rod can be produced by the steering pinion 92 which effects an axial displacement of the rack 84. Axial displacement of the rack 84 is transmitted to the tie rod by a mechanism which includes a fluid motor 130. That fluid motor 130 includes a control cylinder 132 connected to the rack 84 and a piston 134 connected to the steerable wheels. The piston 134 is axially slidable within a chamber 136 formed by the control cylinder 132. Communicating with the chamber 136 on opposite sides of the piston 134 are fittings 138, 140 which are coupled to flexible fluid lines 142, 144, respectively. Those lines 142, 144 are arranged to receive pressurized fluid from a pump 146 after the fluid passes through a valve 148. The valve 148 is actuated to divert pressurized fluid to one of, or neither of, the lines 142, 144 by the controller 32 in the manner discussed earlier herein.

When neither of the lines 142, 144 is communicated with the pump 146, fluid remaining in the chamber 136 on opposite sides of the piston 134 is able to transmit axial force from the control cylinder 132 to the piston 134. Thus, axial movement of the rack 84 produced by the main steering mechanism 92, 106 is transmitted to the tie rod 82 through the control cylinder 132, the fluid in the chamber 136, and the piston 134.

In the event that the controller 32 determines that the orientation of the steerable wheels should be adjusted in order to prevent excessive oversteer or understeer, the valve 148 is actuated to direct pressurized fluid from the pump 142 to one side of the piston 134. As a result, the piston 134 is axially displaced relative to the control cylinder 132 and is able to steer the steerable wheels independently of the movement of the rack 94.

In order to measure the amount of displacement of the tie rod 82 relative to the rack 84, which represents the amount by which the tie rod is displaced by the controller 32, a position sensor 150 is connected to the tie rod. That position sensor 150 is of the linear type and includes a housing 152 mounted to the control cylinder 132 for movement therewith, and a rod 154 connected to the tie rod 82 by means of a bracket 156. The rod 154 is displaced relative to the housing 152 in response to relative displacement between the tie rod and the rack, whereupon the position sensor 150 generates a signal which is fed back to the controller.

In order to measure the amount of displacement of the rack 84, thereby providing an indication of the orientation of the steerable wheels, a rotary position sensor 160 is coupled to the pinion 92. A signal generated by the rotary position sensor is fed back to the controller 32.

A preferred mechanism depicted in FIG. 9 is similar to that depicted in FIG. 8, except that no power steering mechanism is provided, and the control cylinder 132' of the motor 130' is mounted intermediate the axial ends of the rack 84. The fittings 138', 140' are arranged for displacement within a slot 170 formed in the housing part 88'. Linear and rotary position sensors are not depicted, but would be provided. The embodiment according to FIG. 9 operates in the same manner as that disclosed in connection with FIG. 8, the steering forces being transmitted through the rack 84 and the piston 134' en route to the steering arms.

A preferred mechanism depicted in FIG. 10 is similar to that depicted in FIG. 9, except that in lieu of a fluid motor 130', there is provided an electric motor 200. The electric motor 200 includes a housing 201 connected to the rack 84, and an output element in the form of an internally threaded rotary nut 202 which is rotated when an electric power source 204 energizes a stator of the motor 200 in response to a signal from the controller 32. The nut 202 meshes with external threading on the tie rod 82" in order to axially displace the tie rod relative to the rack 84. Although not depicted, position sensors for measuring the displacement of the rack, and relative displacement between the tie rod and rack would be provided. Steering forces from the pinion 92 are transmitted through the rack 84 and the electric motor output nut 202 en route to the steering arms.

FIG. 10A depicts an embodiment wherein an electric motor 200' similar to that described in connection with FIG. 10 is mounted on the end of a steering rod 82''', (i.e., the motor 200' is mounted at the same location as the fluid motor 130 disclosed in connection with FIG. 8). The electric motor 200' includes a housing 201', a threaded rotary nut 202' and an electric power source 204' arranged similar to that disclosed in connection with FIG. 10. The remainder of the steering mechanism not depicted in FIG. 10A is the same as disclosed in connection with FIGS. 8, 8A and 8B.

Figure 11:
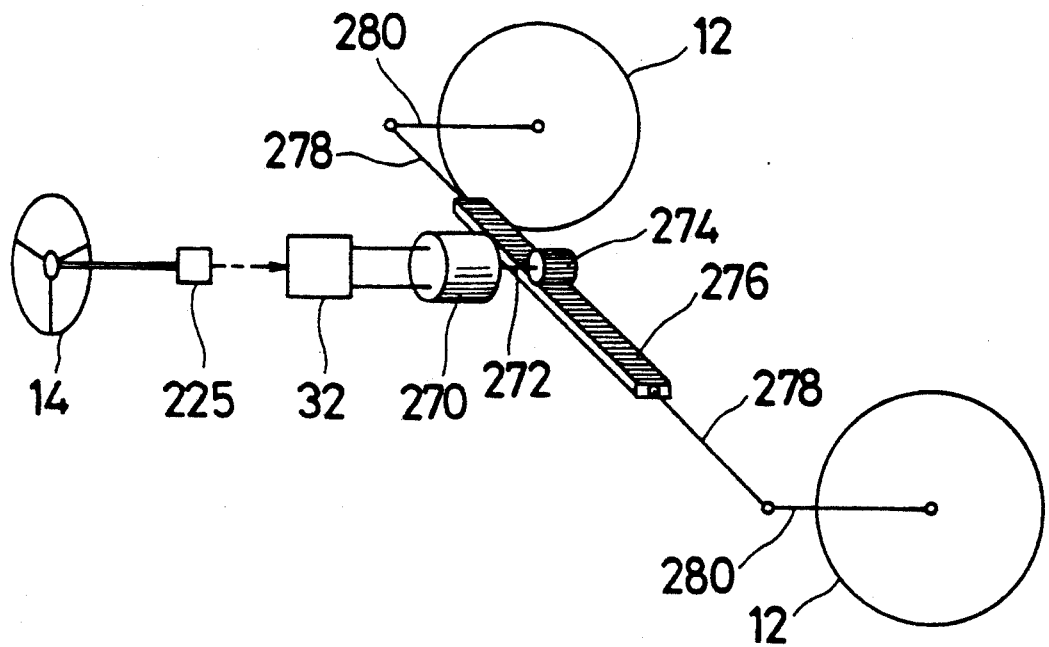
FIG. 11 is a schematic perspective view of a third embodiment of a steering mechanism according to the present invention.

FIG. 11 depicts a third preferred embodiment of the steering mechanism wherein there is no mechanical connection between the steering wheel 14 and the steerable wheels 12. Rather, the rack and pinion are controlled solely by electrical signals from the controller 32. The controller 32 is electrically connected to an electric motor 270, the output shaft 272 of which is connected to a pinion 274. The pinion meshes with the teeth of a rack 276, the ends of which are connected to tie rods 278. The tie rods 278 are connected to steering arms 280.

In operation, rotation of the steering wheel 14 results in a signal being generated by the steering wheel angle sensor 225. That signal is supplied to the controller in the same fashion as disclosed in connection with FIG. 3. Thus, whenever the steering wheel is turned, the controller will deliver a control signal to the motor 270 for turning the steerable wheels 12 by an amount which avoids an appreciable oversteer or understeer.

Figure 12:
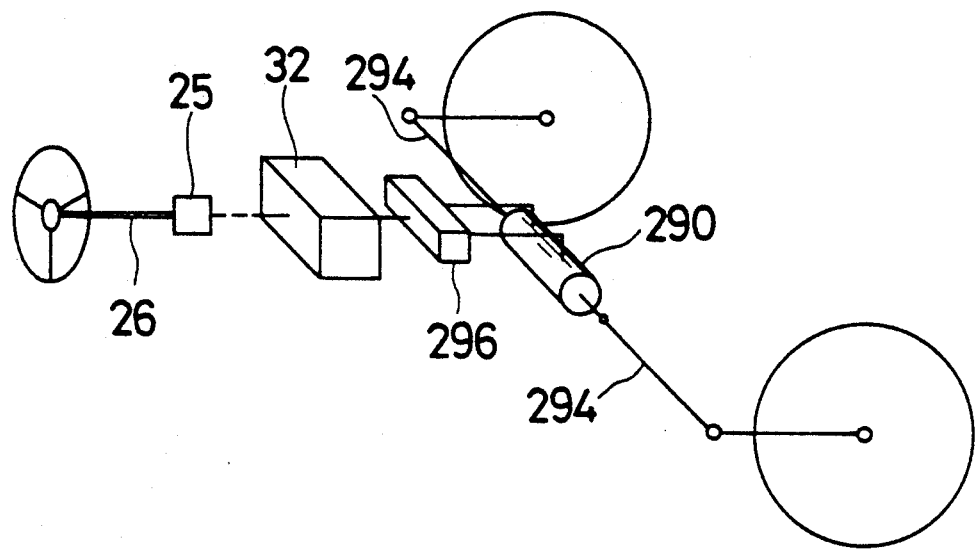
FIG. 12 is a schematic perspective view of a fourth embodiment of a steering mechanism in accordance with the present invention.
Figure 13:
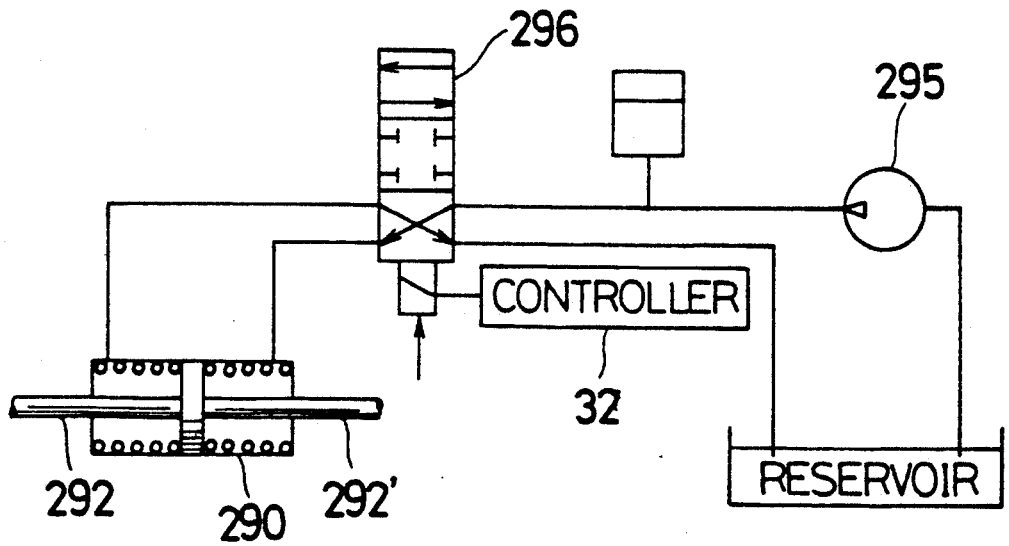
FIG. 13 is a schematic view of a portion of the steering mechanism of FIG. 11.

FIG. 12 depicts a fourth preferred embodiment of a steering mechanism which is a variant of that described above in connection with FIG. 11 in that the controller 32 controls a fluid mechanism similar to that described above in connection with FIGS. 6 and 7. That is, a fluid cylinder 290 has piston rods 292, 292' connected to tie rods 294. The output signal from the controller 32 is delivered to a three-way solenoid valve 296 to cause pressurized fluid to be conducted from a pump 295 to the fluid cylinder 290 to steer the steerable wheels 12.

In accordance with the present invention, a steering system is provided which minimizes oversteer and understeer conditions in a simplified manner requiring a minimum number of parts. The system is highly versatile in that implementation thereof is possible in numerous ways.

Although the invention has been described in connection with preferred embodiments thereof, it will be appreciated by those skilled in the art that additions, substitutions, modifications, and deletions not specifically described, may be made without departing from the spirit and scope of the invention as defined in the appended claims.

What is claimed is:

1. Apparatus for maintaining steering stability of a moving vehicle comprising:

steerable wheels and steering arm means connected to said steerable wheels, and steering means for steering said steerable wheels, including a movable rack, a main steering mechanism, including a steering wheel and pinion, connected to said movable rack for moving said movable rack, motor means operably interconnecting said movable rack and said steering arm means for transmitting steering forces from said main steering mechanism to said steerable wheels, said motor means comprising relatively movable first and second parts, said first part connected to said movable rack and said second part connected to said steering arm means, measuring means for measuring an actual value for a condition of said vehicle, and control means for determining a desired value for said condition, and for generating an output signal in response to a comparison of said desired and actual values, said control means being operably connected to said motor means whereby said motor means is actuated in response to said output signal to steer said steerable wheels independently of the movement of said movable rack.

2. Apparatus according to claim 1, wherein said motor means comprises a fluid motor.

3. Apparatus according to claim 2, wherein said first part comprises a fluid cylinder of said fluid motor and said second part comprises a piston rod of said fluid motor.

4. Apparatus according to claim 1 including hollow housing means, supporting means including elastic grommets supporting said housing means on said vehicle, said movable rack being mounted within said housing means for axial sliding movement relative thereto and comprising a hollow cylindrical member with teeth formed on an outer periphery thereof, said teeth being in mesh with said pinion, a tie rod axially slidably disposed within said rack for axial sliding movement relative thereto, opposite ends of said tie rod connected to said steering arms, said second part of said motor means being connected to said tie rod, said first part of said motor means being connected to said rack.

5. Apparatus according to claim 4, wherein said first part of said motor means comprises a fluid cylinder connected to said rack, said second part of said motor means comprising a piston fixedly connected to said tie rod, said motor means including means for supplying pressurized fluid to opposite sides of said piston.

6. Apparatus according to claim 5, wherein said fluid cylinder is disposed at one end of said rack.

7. Apparatus according to claim 6 including power steering means including a piston fixedly mounted to said rack axially between said pinion and said piston of said motor means.

8. Apparatus according to claim 5, wherein said fluid cylinder is located between two opposite ends of said rack.

9. Apparatus according to claim 4, wherein said rack is eccentric relative to said tie rod to define an enlarged radial thickness portion of said rack in which said teeth are formed.

10. Apparatus according to claim 4, wherein said first part of said motor means comprises an electric motor housing connected to said rack, said second part of said motor means comprising a threaded nut mounted on a threaded periphery of said tie rod.

11. Apparatus according to claim 1, wherein said motor means comprises an electric motor.

12. Apparatus according to claim 11, wherein said first part of said motor means comprises a housing of said motor means and said second part of said motor means comprises an output element of said electric motor.

13. The apparatus according to claim 1, wherein said control means includes first sensor means for detecting a steering angle of said steering wheel, and second sensor means for detecting vehicle speed.

* * * * *